United States Patent
Chen et al.

(10) Patent No.: US 10,924,543 B1
(45) Date of Patent: Feb. 16, 2021

(54) DEPLOYMENT STRATEGY FOR MAINTAINING INTEGRITY OF REPLICATION GROUPS

(71) Applicant: Amazon Technologies, Inc., Seattle, WA (US)

(72) Inventors: Tao Chen, Sammamish, WA (US); Marc John Brooker, Seattle, WA (US); Divya Ashok Kumar Jain, Bellevue, WA (US); Lakshmi N. Pallikila, Seattle, WA (US); Shobha Agrawal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 14/975,603

(22) Filed: Dec. 18, 2015

(51) Int. Cl.
  *G06F 15/16* (2006.01)
  *H04L 29/08* (2006.01)

(52) U.S. Cl.
  CPC ...... *H04L 67/1095* (2013.01); *H04L 67/1097* (2013.01); *H04L 67/16* (2013.01)

(58) Field of Classification Search
  CPC .................. H04L 67/1095; H04L 67/1097
  USPC .................................................. 709/219, 217
  See application file for complete search history.

(56) References Cited

U.S. PATENT DOCUMENTS

| | | | |
|---|---|---|---|
| 5,909,540 A * | 6/1999 | Carter ............... | G06F 9/5016 714/4.4 |
| 6,374,241 B1 | 4/2002 | Lamburt et al. | |
| 6,662,219 B1 | 12/2003 | Nishanov et al. | |
| 7,039,773 B2 | 5/2006 | Hu et al. | |
| 7,461,130 B1 | 12/2008 | AbdelAziz et al. | |
| 7,711,820 B2 | 5/2010 | Sharma et al. | |
| 7,937,482 B1 | 5/2011 | Vermeulen et al. | |
| 8,135,775 B1 * | 3/2012 | Anderson ............... | G06F 8/61 709/203 |
| 8,301,600 B1 | 10/2012 | Helmick et al. | |
| 8,572,031 B2 | 10/2013 | Merriman et al. | |
| 8,732,517 B1 | 5/2014 | Stefani et al. | |
| 8,843,441 B1 | 9/2014 | Rath et al. | |
| 8,856,593 B2 | 10/2014 | Eckhardt et al. | |
| 8,868,514 B2 | 10/2014 | Lomet et al. | |
| 8,965,849 B1 | 2/2015 | Goo | |
| 9,047,246 B1 | 6/2015 | Rahut | |
| 9,047,331 B2 | 6/2015 | Rao et al. | |

(Continued)

OTHER PUBLICATIONS

Abadi, "Consistency Tradeoffs in Modern Distributed Database System Design," Computer 45(2):37-42, Feb. 2012.
Bernstein, "Rethinking Eventual Consistency," Proceedings of the 2013 ACM SIGMOD International Conference on Management of Data, Jun. 22-27, 2013, 5 pages.
Chandy et al., "Distributed Snapshots: Determining Global States of Distributed Systems," ACM Transactions on Computer Systems 3(1):63-75, Feb. 1985.

(Continued)

*Primary Examiner* — George C Neurauter, Jr.
*Assistant Examiner* — Joel Mesa
(74) *Attorney, Agent, or Firm* — Davis Wright Tremaine LLP

(57) ABSTRACT

Data replication groups may be used to store data in a distributed computing environment. The data replication groups may include a set of nodes executing a consensus protocol to maintain data durably. The nodes may be executed by one or more host computer systems. In order to avoid failure of the data replication groups as safe deployment strategy is provided. The one or more host computer systems may be assigned to deployment groups where the number of hosts assigned to the deployment groups host less than a quorum of the nodes of a particular data replication group.

21 Claims, 8 Drawing Sheets

(56) References Cited

U.S. PATENT DOCUMENTS

| | | |
|---|---|---|
| 9,223,843 B1 | 12/2015 | Madhavarapu et al. |
| 9,230,000 B1 | 1/2016 | Hsieh et al. |
| 9,317,576 B2 | 4/2016 | Merriman et al. |
| 9,489,434 B1 | 11/2016 | Rath |
| 9,552,242 B1 | 1/2017 | Leshinsky et al. |
| 9,569,513 B1 | 2/2017 | Vig et al. |
| 9,639,589 B1 | 5/2017 | Theimer et al. |
| 9,805,108 B2 | 10/2017 | Merriman et al. |
| 10,171,629 B2 | 1/2019 | Bute et al. |
| 10,489,230 B1 | 11/2019 | Chen et al. |
| 2002/0161889 A1 | 10/2002 | Gamache et al. |
| 2004/0263152 A1 | 12/2004 | Ahrikencheikh |
| 2005/0005200 A1 | 1/2005 | Matena et al. |
| 2006/0020634 A1 | 1/2006 | Huras et al. |
| 2006/0187906 A1* | 8/2006 | Bedi .................. H04L 69/40 370/352 |
| 2006/0218204 A1 | 9/2006 | Ofer et al. |
| 2007/0156842 A1 | 7/2007 | Vermeulen et al. |
| 2007/0299955 A1 | 12/2007 | Hoffman et al. |
| 2009/0049240 A1* | 2/2009 | Oe .................. G06F 11/2061 711/114 |
| 2010/0274768 A1 | 10/2010 | Wang et al. |
| 2011/0307886 A1* | 12/2011 | Thanga ............. G06F 9/5077 718/1 |
| 2012/0011398 A1 | 1/2012 | Eckhardt et al. |
| 2012/0117229 A1 | 5/2012 | Van Biljon et al. |
| 2012/0197868 A1 | 8/2012 | Fauser et al. |
| 2013/0110774 A1 | 5/2013 | Shah et al. |
| 2013/0290249 A1 | 10/2013 | Merriman et al. |
| 2014/0032506 A1 | 1/2014 | Hoey et al. |
| 2014/0136896 A1 | 5/2014 | Tak et al. |
| 2014/0172944 A1 | 6/2014 | Newton et al. |
| 2014/0337393 A1 | 11/2014 | Burchall et al. |
| 2015/0169417 A1* | 6/2015 | Brandwine ........ G06F 11/1484 714/4.11 |
| 2015/0186229 A1 | 7/2015 | Bortnikov et al. |
| 2015/0347548 A1 | 12/2015 | Mortensen et al. |
| 2015/0372389 A1 | 12/2015 | Chen et al. |
| 2016/0147859 A1 | 5/2016 | Lee et al. |
| 2017/0004317 A1 | 1/2017 | Bumbulis |
| 2017/0270176 A1 | 9/2017 | Horowitz et al. |
| 2017/0366451 A1 | 12/2017 | Schreter |
| 2017/0366619 A1 | 12/2017 | Schreter |
| 2017/0371567 A1 | 12/2017 | Piduri |

OTHER PUBLICATIONS

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, http://research.microsoft.com/en-us/um/people/lamport/pubs/paxos-simple.pdf [retrieved Aug. 22, 2016], 2001, 14 pages.

Letia et al., "CRDTs: Consistency without concurrency control," Rapport de recherche 6956, Jun. 2009, 13 pages.

Maccormick et al., "Niobe: A Practical Replication Protocol," Microsoft Research, https://www.microsoft.com/en-us/research/wp-content/uploads/2007/08/tr-2007-112.pdf [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, http://arxiv.org/pdf/1209.4187.pdf [retrieved Aug. 22, 2016], 2012, 9 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science)&oldid=783901344, 19 pages.

Chen et al., "Replication Group Pools for Fast Provisioning," U.S. Appl. No. 14/954,928, filed Nov. 30, 2015.

Dhoolam et al., "Node Placement for Replication Groups," U.S. Appl. No. 15/264,479, filed Sep. 13, 2016.

Wikipedia, "Ford-Fulkerson Algorithm," Wikipedia, The Free Encyclopedia, Aug. 9, 2016, https://en.wikipedia.org/wiki/Ford%E2%80%93Fulkerson_algorithm [Retrieved Aug. 29, 2016], 5 pages.

Wikipedia, "Maximum flow problem," Wikipedia, The Free Encyclopedia, Aug. 22, 2016, https://en.wikipedia.org/wiki/Maximum_flow_problem [Retrieved Aug. 29, 2016], 11 pages.

\* cited by examiner

DEPLOYMENT STRATEGY FOR MAINTAINING INTEGRITY OF REPLICATION GROUPS

BACKGROUND

Organizations invest in technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect data, for example customer data, operational data, data being stored in data volumes, and metadata associated with such data, against failures, data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
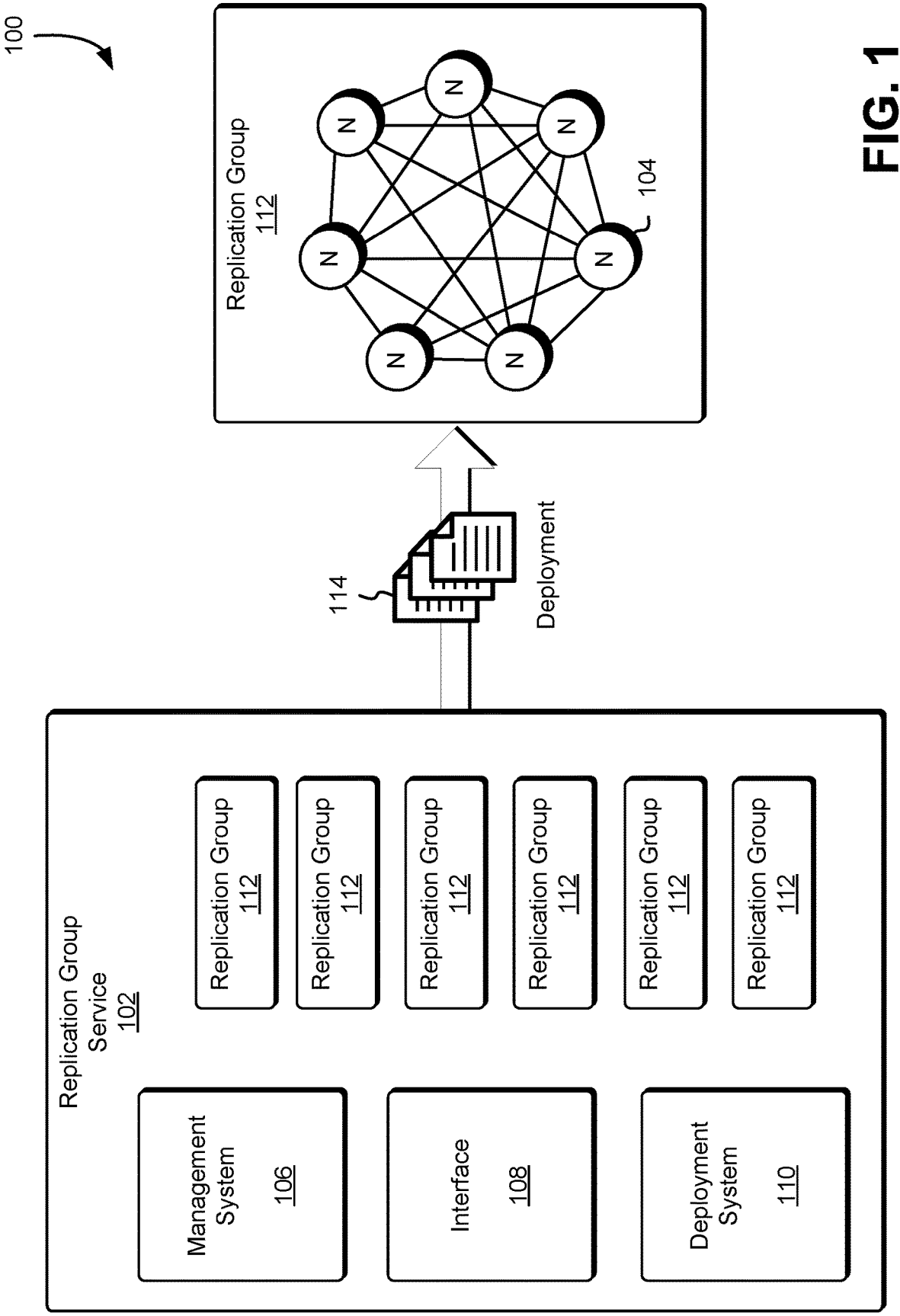
FIG. 1 illustrates aspects of a deployment strategy for a data replication group fleet in accordance with at least one embodiment.

In various examples described below, a data replication group fleet comprises a large number of physical host computer systems hosting an even larger number of data replication groups. For example, the data replication group fleet may consist of 1,000 physical hosts supporting 1,000,000 data replication groups, where each physical host executes a number of nodes of a number of data replication group. A data replication group may consist of a number of nodes executed by one or more host computer systems, where the nodes implement a consensus protocol, such as Paxos, to enable consistent data replication between the nodes. In general, the nodes may store replicas of a resource and/or a certain amount of data. In distributed computing systems, data replication reduces the risk of failure and mitigates possible data loss in the case of system failure. To increase efficiency and utilization of the hosts, the hosts may execute multiple nodes from multiple data replication groups, although it may not host more than one node from a single data replication group (e.g., a particular host may execute a node from replication groups A, B, and C, but may not execute two nodes for replication groups A, B, or C). For example, a single host may execute 2 to 3 nodes from 1,000 data replication groups. This may maximize the utilization of the hosts and reduce idle time. The consensus protocol may enable fault tolerance of up to n divided by 2 node failures, where n is the total number of nodes in the data replication group.

However, when maintaining a large data replication fleet that may support large numbers (e.g., millions) of data replication groups, where data replication groups may also share physical hosts, it may be difficult to deterministically select a set of physical hosts that may not endanger a majority of any data replication group. Deployment of software and/or software updates is one example of such scenario. Deployment examples include bug fix, software version upgrade, or host security patches. A deployment to all hosts in the data replication group fleet may be needed to upgrade software or other executable code maintained by the physical hosts. In most of the cases, this may require a restart which may introduce a short (or even long) down time on the hosts' receiving the deployment. This may endanger a majority of the nodes of the data replication groups executed by the host computer systems and endanger the resiliency and durability of the data replication groups. One example of a safe deployment strategy is to deploy to one host at a time, which may ensure that at any time, less than a majority of the nodes of the data replication groups executed by the host fail during or as a result of the deployment. However, this serial deployment process results in a very slow deployment cycle that can span weeks or even months. Therefore, a strategy is needed to balance between the deployment speed and safety.

In one such deployment strategy described herein the data replication group fleet may be subdivided into a static number of 'M' deployment groups, where M is greater than or equal to 3 and less than or equal to 'N,' where N is the total number of nodes in a data replication group. For example, when M equals 4, the data replication group fleet may be split into 4 distinct deployment groups. In this manner, deployments may be sent to all of the hosts in the a single deployment group at once and the amount of time required to deploy to all the hosts may be reduced. When provisioning new hosts for the data replication group fleet, the host may be evenly distributed and/or assigned into the various deployment groups. This ensures that none of the deployment groups contain a majority of the nodes of any one data replication group. Therefore, if a deployment to a particular deployment group causes the entire set of hosts in the deployment group to fail for some interval of time, the data replication groups will not lose a majority of their nodes. As a result of these deployment groups, a deployment service or other entity may safely deploy software and/or software updates concurrently to all hosts in a particular deployment group of the M deployment groups.

Additionally, this deployment strategy may require that the number of hosts in each M deployment group remains balanced or within a certain threshold to avoid affecting a majority of the nodes of a data replication group. Therefore, redistribution of hosts between the M deployment groups may be required. For example, if the difference between the highest capacity deployment group and the lowest capacity deployment group exceeds some threshold, then a number of hosts (e.g., the difference divided by 2) may be moved from the highest capacity deployment group to the lowest capacity deployment group. This difference between the groups may be checked at various times, for example, when a host is added or removed from a deployment group. For example, a replication group service responsible for maintaining the data replication groups may track the number of hosts in each deployment group and use this information to maintain a balance between the deployment groups.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider may operate a replication group service 102 configured to manage one or more data replication groups 112. The nodes 104 of the replication group 112 may store copies or replicas of data so as to provide redundancy in the event of the loss of some number of nodes 104. The Replication group service 102 may be configured as a clustered storage system for storing customer data, metadata about customer data, or other data across a plurality of physical hosts. Such a clustered storage configuration may reduce the risk of failure and increase availability of the data replication groups 112 or particular nodes of the data replication groups 112 during network connection events and/or network connection issues. For example, the number of nodes 104 of the data replication group 112 may be selected such that the probability of a majority of the nodes 104 of the data replication 112 failing is below some threshold.

The data replication service 102 may maintain a plurality of data replication groups 112; in turn, each data replication group 112 may consist of a plurality of nodes 104. The data replication groups 112 may include replicated state machines or other storage systems configured to store data in a distributed computing environment. In various embodiments, each node 104 is a process, executed by a host computer system or other computer system, described in greater detail below, which participates in one or more data replication groups 112. For example, for a particular data replication group 112 implementing the Paxos consensus protocol, each node 104 of the data replication group 112 may implement one or more roles of the Paxos consensus protocol such as the role of acceptor, proposer, and/or learner. In this manner, the nodes 104 of the data replication group may be responsible for the durability of customer data or other data maintained by the data replication group 112.

The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes 104 of the data replication group 112. The Paxos consensus protocol may be used by replication service 102 and the data replication groups 112 to implement state machine replication and/or data replication in a distributed computing environment, such as a computing resource service provider environment 100 illustrated in FIG. 1. The Paxos consensus protocol may define the set of actions which may be performed by the nodes 104 of the data replication groups 112 according to one or more predefined roles included in the Paxos consensus protocol: client, acceptor, proposer, learner, and leader. In some embodiments, a single node 104 of a particular data replication group 112 may implement one or more roles at any given time. For example, a particular node 104 may be a leader, acceptor, and learner in accordance with the Paxos consensus protocol.

A client, which may include a computer system under the control of a customer of the computing resource service provider and/or application or other executable code executed by one or more other computer systems or services of the computing resource service provider, may issue requests to the data replication group 112 and/or replication service 102 and wait for a response. For example, the client may include a customer transmitting a storage request to an interface 108 of the replication service 102. The interface 108 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 108 may also accept requests for other components of the data replication service 102 such as the management system 106 or a deployment system 110. For example, the interface 108 may receive a request and/or command to update software executed by the nodes 104 or host computer server executing the nodes 104 and direct the request to the deployment system described in greater detail below.

Returning to the example above, in accordance with the Paxos protocol, acceptors implemented by one or more nodes 104 of a data replication group 112 may be collected or assembled into groups, collectively referred to as quorums. In various embodiments, a quorum includes a majority of the nodes 104 of the data replication group 112. In various embodiments of the Paxos protocol, any message sent to an acceptor must be sent to the quorum of acceptors and any message received from an acceptor is ignored unless a copy is received from each acceptor in the quorum. A proposer, when implemented by a node 104 of the data replication group 112, may transmit proposals to acceptors, a proposal may include a message attempting to reach an agreement on a value and/or action by the acceptors. A learner, when implemented by a node 104 of the data replication group 112, may perform some action once an agreement is reached (e.g., transmit a response to the client). In general, any protocol that satisfies the consensus requirements of the replication service 102 and data replication groups 112 may be implemented in accordance with the embodiments described herein. Furthermore, in some embodiments, additional constraints may be placed on the consensus protocol implemented by the replication service 102 and data replication groups 112 as required. For example, the replication service 102 and data replication groups 112 may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other services of the computer system, or replication service 102. For example, the number of nodes 104 in the data replication 112 may be reduced if a particular service and/or customer requires reduced latency and response time. In contrast, if a customer and/or service requires higher fault tolerance and data durability, the number of nodes 104 in the data replication group 112 may be increased. A management system 106 of the data replication service 102 may be responsible for determining the number of nodes 104 in a particular data replication group. The management system 106 may be a process or other application executed by a host computer system.

Furthermore, the management system 106 may be responsible for creation, termination, and assignment of the data replication groups. For example, the management system 106 may determine that a new data replication group is to be created and may communicate with one or more other services (not shown in FIG. 1 for simplicity) of the computing resource service provider in order to create the new data replication group 112. The process of creating new data replication groups 112 is described in greater detail below. The management system 106 may also be responsible for assigning and/or associating a particular data replication group 112 to a customer or deployment group. For example, the management system 106 may map a particular data replication group 112 or address of the particular data replication group to a customer such that the particular data replication group 112 may receive traffic from or on behalf of the customer. In another example, the management system 106 may determine a number of host computer systems included in one or more deployment groups to execute nodes 104 of the data replication group.

The deployment system 110 may be a process or other application executed by a host computer system. Furthermore, the deployment system 110 may be responsible for maintaining a plurality of deployment groups and distributing deployments 114 to one or more host computer systems executing one or more nodes 104 of the data replication group 112. The nodes 104 of the data replication group 112 may be distributed across a plurality of host computer systems such that no one host computer system executes a quorum of the nodes 104 of a particular data replication group. Deployments 114 may include any software deployment or other distribution of executable code configured to install and/or update software of a host computer system or other computer systems capable of executing the source code associated with the software. Software deployment may include all of the activities that make a software system available for use. The general deployment process may consist of several interrelated activities with possible transitions between them. These activities can occur at the software developer side, client side, or both. Various different deployments and deployment activates may be utilized in accordance with the present disclosure.

The deployment system 110 may manage various deployment activities such as preparing a deployment for release to the host computer systems, installing and activating the executable content included in the deployment, version tracking, updating, uninstalling, and various other activities suitable for deploying software to hosts. The deployment system 110 may also determine a number of deployment groups, tag host computer systems as being members of a particular deployment group, and rebalancing the deployment groups during commissioning and decommissioning of hosts. For example, a particular host may fail and therefore must be decommissioned or otherwise removed from the set of host used to execute nodes 104 of the data replication groups 112. The decommissioning process may include determining a number of hosts in two or more deployment groups and moving one or more hosts between deployment groups to maintain that no hosts in any one deployment group executes a quorum of nodes 114 in a particular data replication group 112.

In another example, the total number of host computer systems in the data replication group fleet may be 10,000 with each data replication group 112 consisting of seven nodes 104, as illustrated by FIG. 1. The deployment system 110 or other component of the replication group service 102, such as the management system 106, may determine a number of deployment groups based at least in part on one or more safety constraints (e.g., that no hosts in a deployment group contains a quorum of the nodes 104 for any particular data replication group 112). As described above, the number of deployment groups M may be determine, where M is greater than or equal to 3 and less than or equal to 'N,' where N is the total number of nodes in a data replication group (e.g., seven). If we select M=3, for example, then with 10,000 host computer systems there will be approximately 3,300 hosts in each deployment group. By evenly distributing the nodes 104 between host computer systems (e.g., by using a round robin selection strategy), the data replication group 112 will utilize a maximum number of 3 hosts from each deployment group (e.g., 3 hosts from group 1, 2 hosts from group 2, and 2 hosts from group 3 for a total of 7 nodes 104 executed by 3 host computer systems). In this example, the deployment 114 may be concurrently transmitted to all hosts computer systems in a particular deployment group at a given point in time with a maximum impact on 3 of the 7 nodes 104 of any particular data replication group.

In various embodiments, the host computer systems may be initialized and configured to execute a certain number of nodes 104 of one or more data replication groups 112. These host computer systems may be available and idle until the replication group service 102 determines to utilize the resources of the host computer system. For example, when the data replication group service 102 receives a request for a data replication group, the data replication group service 102 or component thereof, such as the management system 106, may select host computer systems to implement nodes 104 of the data replication group 112 based at least in part on an evenness criteria described in greater detail below. This ensures, in some embodiments, that as data replication groups 112 are created, later deployments 114 to the host providing the nodes 104 of the data replication groups 112 do not affect more than a quorum of the nodes 104 of the data replication groups 212. In addition, when providing a deployment 114 to a deployment group, the deployment group may be selected based at least in part on a score associated with the deployment group described in greater detail below. For example, a deployment group with a lower score may indicate that the deployment group is healthy or the deployment 114 will effect a smaller number of active host computer systems.

Figure 2:
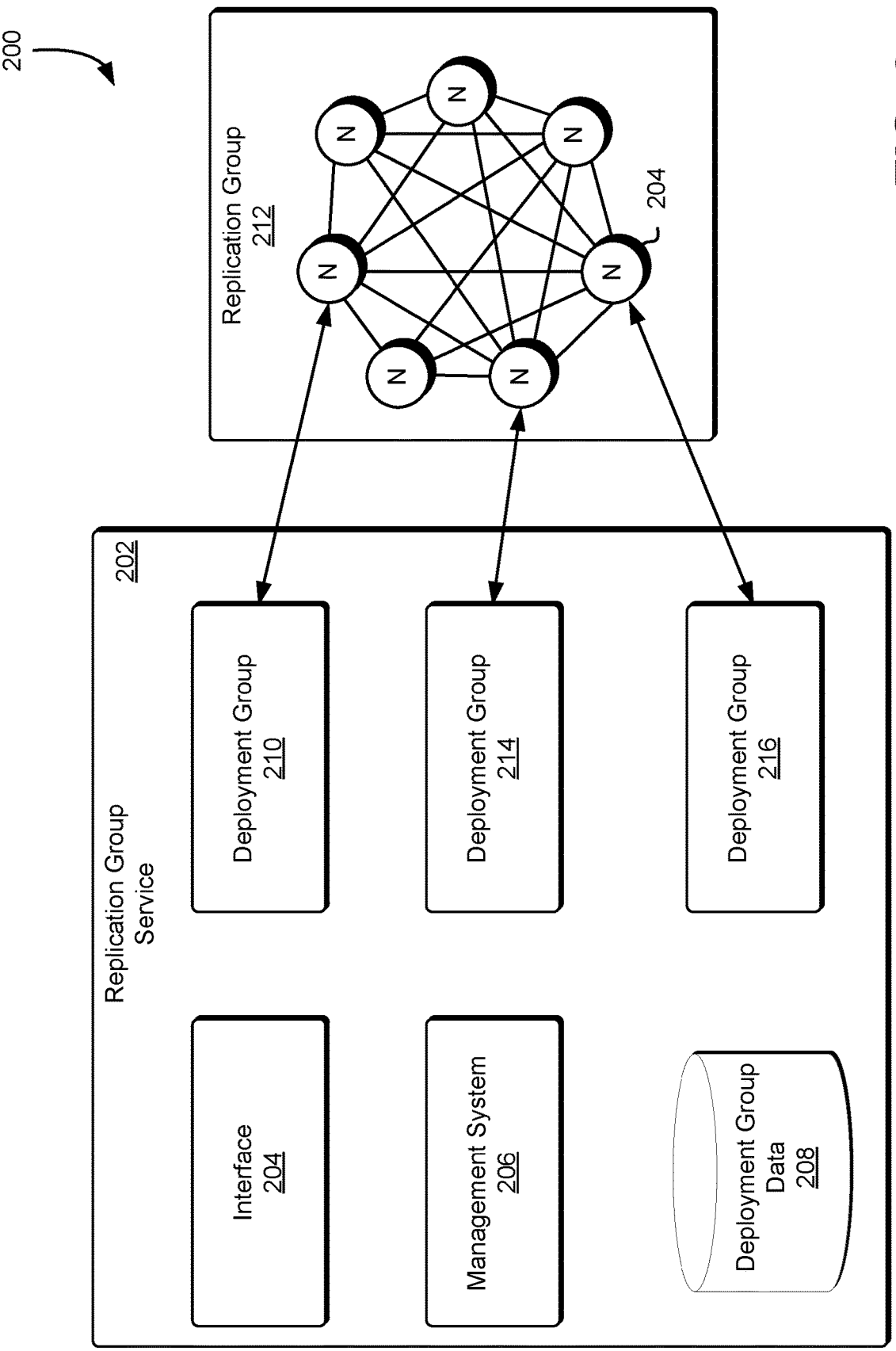
FIG. 2 illustrates an environment in which a set of replication groups may be included in accordance with at least one embodiment.

FIG. 2 illustrates an environment 200 in which a computing resource service provider may operate a replication group service 202 configured to manage one or more data replication groups 212 in one or more deployment groups 210, 214, and 216. The data replication group 212 may be provisioned such that it may implement a consensus protocol and begin to receive traffic. Software deployments to the data replication groups, nodes 204, or host computer systems implementing the data replication groups may increase latency or violate the terms of a service-level agreement (SLA). An SLA may be part of a service contract or other agreement between a computing resource service provider and a customer where a particular service is formally defined. Particular aspects of the service (e.g., scope, quality, responsibilities, latency, availability) may be agreed on between the computing resource service provider and the customer. The deployment groups 210, 214, and 216 of replication groups service 202 may enable the computer resource service provider to achieve a predefined level of performance as indicated in a particular SLA. For example, by ensuring availability of the data replication groups 212 and node 204 during deployment of software and/or software updates. The deployment groups 210, 214, and 216 may enable the replication groups service 202 to more efficiently, safely, and quickly deploy software to host computer systems executing one or more nodes of the data replication groups.

Host computer systems of the data replication group fleet may be provisioned such that nodes of the data replication groups 212 may be loaded into memory of the host computer systems and beginning performing operations of the data replication group 212. For example, a new host computer system may be provisioned to support 10 nodes 204, initially the new host may be supporting (e.g., executing) zero nodes. The new host computer system may be added to the deployment group 210 or tagged as a member of the deployment group 210. The management system 206 may then determine to add a node 204 to a particular data replication group, for example, during creation of the data replication group 212 or to replace a failing node 204 of the data replication group 212. The management system 206 may then select the new host computer system to execute the node 204, this may cause an image of a node 204 to be provided to the new host computer system and instantiated by the new host computer system. Once the node 204 has been instantiated by the new host computer system, the node 204 may begin to perform operations of the data replication group 212, such as executing a consensus protocol.

As described above, the replication group service 202 may include an interface 205 and management system 206. Furthermore, although all of the data replication groups 212 illustrated in FIG. 2 are members of the deployment groups 210, 214, and 216, other configurations of data replication groups 212 and deployment groups 210, 214, and 216 are within the scope of the present disclosure. For example, the replication group service 202 may maintain one or more data replication groups 212 outside of or aside from the deployment groups 210, 214, and 216. In another example, the replication group service may maintain a plurality of deployment groups 210, 214, and 216.

The replication group service 202 may further include deployment group data 208. Deployment group data 208 may consist of data corresponding to the data replication groups 212, nodes 204 of the data replication groups 212, number of deployment groups, nodes 204 in each deployment group, data replication groups supported by each deployment group, and any such other data as required by the management system 206 and/or replication group service 202. Various nodes 204 in the various deployment groups 210, 212, and 214 may be members of the same data replication group, indicated by lines connecting the nodes 204 of the different deployment groups 210, 212, and 214 in FIG. 2. For example, each deployment group 210, 212, and 214 may include one node 204 of a data replication group consisting of three nodes 204. Furthermore, the deployment groups 210, 212, and 214 may include a plurality of host computer systems, each host computer system may implement a single node 204 of a particular data replication group. For example, deployment group 212 may include 3 distinct host computer systems each executing one node 204 of a particular data replication group. The deployment group data 208 may be maintained in a database of other data stores such that the data is accessible and/or queryable by other components of the replication group service 202, customer, or other services such as a deployment service. In one example, replication data group data 208 may maintain data to aid deployment of software updates to host computer systems executing nodes of the data replication groups 212.

The data in the deployment group data 208 may be updated at various intervals of time. For example, the management system 206 may query the host computer systems, nodes 204, and/or data replication groups 212 in order to obtain information useable to update the deployment group data 208. The deployment group data 208 may also include information corresponding to the number of data replication groups 212, nodes of the data replication group, and/or host computer systems in the deployment groups 210, 214, and 216 as well as a maximum number of each to be included in the deployment groups 210, 214, and 216. Furthermore, the deployment group data 208 may include a maximum number of host computer systems to be included in the deployment groups 210, 214, and 216, a minimum number of host computer systems to be included in the deployment groups 210, 214, and 216, a score calculated based at least in part on a balance of nodes 204 between the deployment groups 210, 214, and 216 and a threshold value corresponding to the maximum allowable difference between the deployment group with the most number of host computer systems and the deployment group with the least number of host computer systems. In addition, the threshold value may correspond to the difference between the score calculated for each deployment group 210, 214, and 216.

The replication group service 202 or component thereof may utilize this information to determine a rate at which new host computer systems are to be added to the deployment groups 210, 214, and 216. The process for adding new host computer systems to the deployment groups 210, 214, and 216 may include identifying a set of physical hosts suitable for hosting a new data replication group 212, initializing nodes 204 on the set of physical hosts to be included in the new data replication group 212, initializing a consensus protocol among the nodes, validating the health of the data replication group 212, and updating the replication data store 208 to indicate that the new data replication group 212 is ready to receive traffic and is a member of a particular deployment group. Validating the health of a node 204 and/or data replication group 212 may include a determination that the consensus protocol is executing correctly on the node and/or data replication group 212. The consensus protocol may include a heartbeat or other messages exchanged between nodes of the data replication group 212 that indicate that a particular node is operating as expected. A data replication group 212 may be considered healthy if a quorum of the nodes of the data replication group 212 are operating as expected (e.g., have successfully validated the health of the node).

The deployment groups 210, 214, and 216 may include a number of host computer systems. This number of host computer systems may be initialized prior to the replication group service 202 assigning the host computer systems to the deployment groups 210, 214, and 216. A request for allocating storage for a new resource, customer, or other service may then be received by the replication group service 202 at the interface 205. The management system 206 or other component of the replication group service 202 may then select one or more host computer systems from the deployment groups 210, 214, and 216 to execute a number of nodes of the data replication group 212. As described above, the host computer systems may be selected such that no select host computer systems and/or deployment group implements a quorum of the nodes of the replication group 212. In addition, the host computer systems may be selected such that the number of hosts in each deployment group 210, 214, and 216 is within a ceiling. The ceiling may be calculated based at least in part on the total number of nodes in the deployment groups 210, 214, and 216 divided by the total number of deployment groups.

Figure 3:
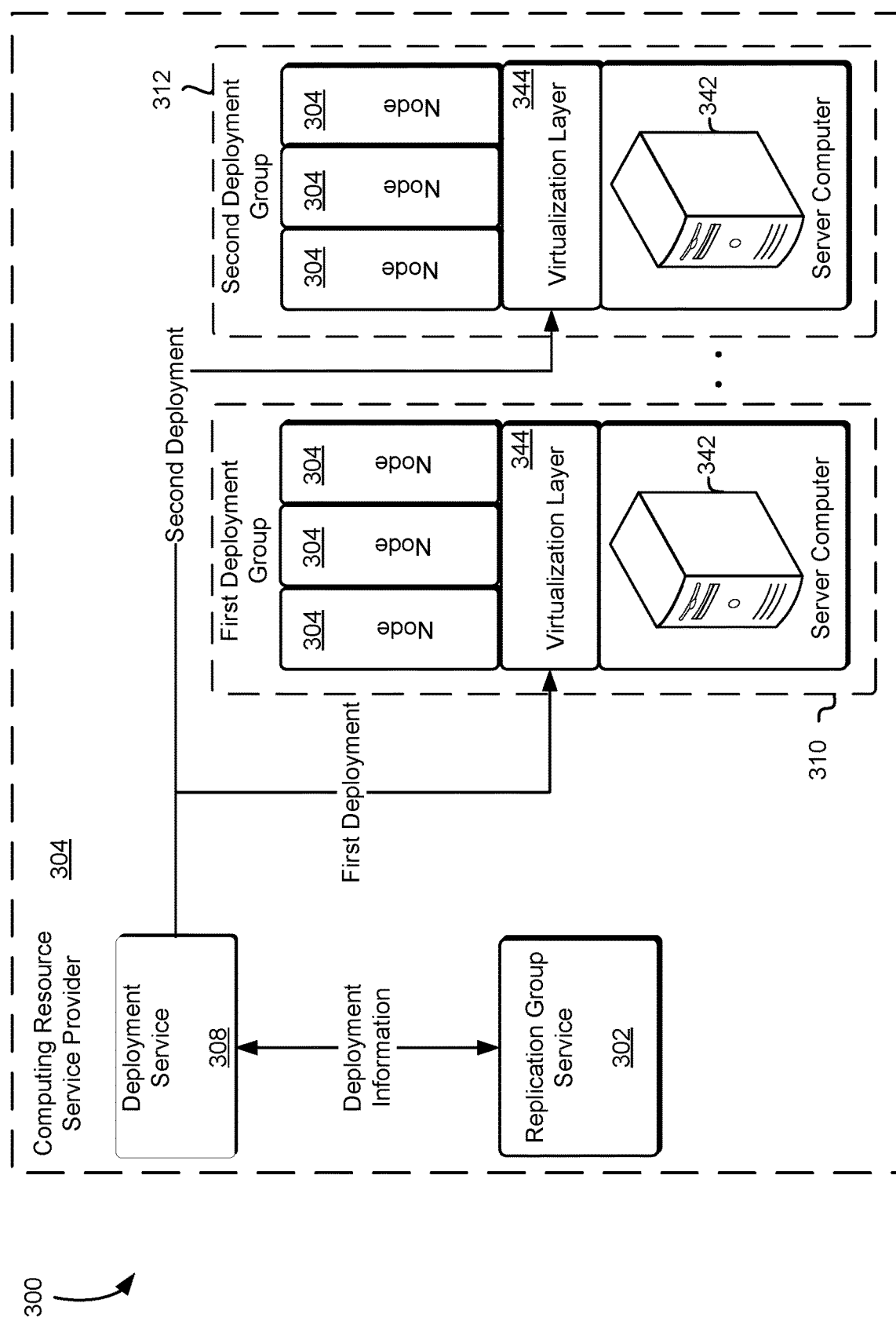
FIG. 3 illustrates an environment in which various aspects of deploying software to data replication group host computer systems in a fleet in accordance with at least one embodiment.

FIG. 3 illustrates a replication group service 302 of a computing resource service provider environment 300 in accordance with at least one embodiment. The replication group service 302, which may be implemented by physical hardware, is used by a computing resource service provider 304 to provide durable storage resources for customers and/or other services of the computing resource service provider 304. The replication group service 302 may include a group of computing systems, such as the server computers 342 described in detail below, configured to manage and provide data replication groups for use by customers or other services of the computing resource service provider 304. The physical hardware may include a server computer 342. The server computer 342 may be any device or equipment configured to execute instructions for performing data computation, manipulation, or storage tasks, such as a computer or a host computer system. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 344 may include a bare metal hypervisor or a hosted hypervisor. The virtualization layer 344 executing on the service computer 342 enables the physical hardware to be used to provide computational resources upon which one or more data replication groups and/or component thereof such as a node 304, master node, or new node as described above may operate. For example, the virtualization layer 344 enables a particular node of a data replication group to access physical hardware on the server computer 342 through virtual device drivers or other executable code on the node 304. The virtualization layer 344 may include a hypervisor or virtualization software and/or hardware. The virtualization layer 344 may also include an instance of an operating system dedicated to administering the data replication group or component thereof running on the server computer 342. Each virtualization layer 344 may include its own networking software stack, responsible for communication with other virtualization layers 344 and, at least in some embodiments, also responsible for implementing network connectivity between the data replication group or components thereof running on the server computer 342 and other data replication group running on other server computers 342.

Furthermore, the server computer 342 may host multiple virtualization layers 344 of the same or different types on the same server computer 342 as well as data replication groups of the same or different types. For example, a server computer system 342 may host a first node of a first data replication group and may host a second node that is a member of a second data replication group. In addition the server computer 342 may be a member of a deployment group such as a first deployment group 310 or a second deployment group 312. Although only two deployment groups are illustrated in FIG. 3 any number of deployment groups may be utilized in connection with the present disclosure.

The virtualization layer 344 may be any device, software, or firmware used for providing a virtual computing platform and/or virtualized computing resources for the data replication group and/or component thereof. The virtual computing platform may include various virtual computer components, such as one or more virtual CPUs, virtual memory, and the like. The data replication group may be provided to the customers or other service of the service provider 304 and the customers may store data or other information on the data replication group or component therefor. Further, the computing resource service provider 304 may use one or more of its own data replication group for supporting execution of its applications and providing storage for such applications.

Commands and other information may be included in an application program interface (API) call from the replication group service 302 or a deployment service 308, described in greater detail below, to the virtualization layer 344. The replication group service 302 enables the customers and other services of the computing resource service provider 304 to manage and operate the data replication group. For example, the client may transmit a request to the replication group service 302 to obtain log information corresponding to a particular data replication group. The request may be an API call including information corresponding to the client, the deployment service 308, or the particular data replication group. The replication group service 302 may determine the corresponding virtualization layer 344 for the data replication group included in the request and transmit a command to the virtualization layer 344 to obtain operation logs stored locally by the data replication group.

A deployment service 308 may be implemented by the computing resource service provider 304. The deployment service 308 may include a group of computing systems, such as the server computers 342 described in detail below, configured to manage deployment of software and/or software updates to the server computers 342. The deployment service 308 may manage software deployments and updates for any executable code maintained by the server computers 342 such as operating systems, a hypervisor or other virtualization layer 344, nodes 304, data replication group, or any other application or software executable by the server computer system 342. The replication group service 302 and the deployment service 308 may exchange deployment information. For example, the deployment service 308 may indicate to the replication group service 302 that a deployment is to be completed. In another example, the replication group service 302 may provide the deployment service 308 with information corresponding to the deployment groups such as which server computers 342 are in which group. The deployment service 308 may then use this information to execute a first and a second deployment as illustrated in FIG. 3.

The separate deployments may ensure that a quorum of the nodes 304 of the data replication groups are not executing a deployment at the same time. In addition, when adding new server computers 342 to the deployment groups, the replication group service 302 may add server computers according to a round robin algorithm. The round robin algorithm may assign each new server computers 342 to a deployment group in equal portions and in circular order, handling all deployment groups without priority. Round robin algorithms may include various scheduling algorithms configured to ensure near equal distribution. For example, with 3 deployment groups, new server computers 342 may be added to the first deployment group, then the second deployment group, then the third, and then back to the first deployment group in circular order thereby maintaining a balanced number of servers in each deployment group. Various rebalancing operations may be required as described in greater detail below.

Figure 4:
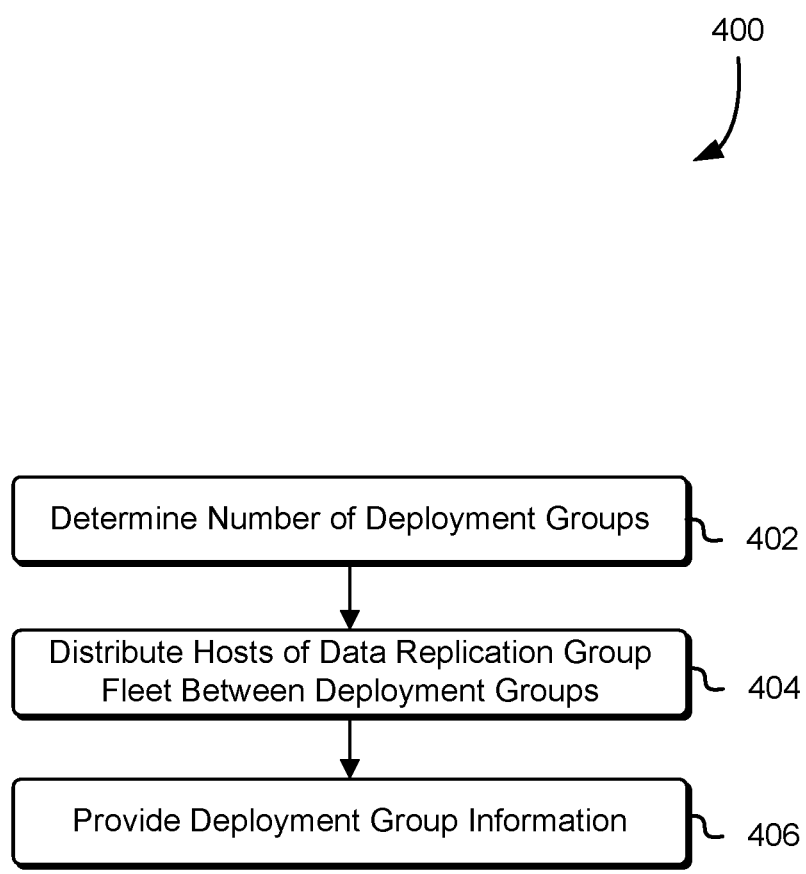
FIG. 4 shows an illustrative process which may be used to distribute host computer systems of a data replication group fleet into a number of deployment groups in accordance with at least one embodiment.

FIG. 4 is a block diagram illustrating an example of a process 400 for provisioning a number of deployment groups for a set of host computer systems of a data replication group fleet in accordance with at least one embodiment. The process 400 may be performed by any suitable system such as a management system of a replication group service as described above in connection with FIGS. 1-3. The process 400 includes a number of deployment groups 402. The number of deployment groups may be determined such that the number of hosts in the deployment groups do not host a quorum of the nodes of the data replication groups. As described above, the number of deployment groups may be selected from a number greater or equal to M and less than N, where M is a number less than the quorum of nodes and N is the total number of nodes of the data replication group. This may ensure that any deployment to any deployment group does not affect a quorum of the nodes of the data replication groups thereby maintaining availability of the data replication groups.

The system performing the process 400 may then distribute host computer systems of the data replication group fleet between the deployment groups 404. This may include provisioning new host computer systems or distributing previously provisioned host computer systems. Various strategies or evenness criteria may be utilized to ensure that the host computer systems are evenly distributed between the deployment groups. For example, a round robin algorithm may be used. In another example, the total number of host computer systems may be divided by number of deployment groups and that number of host computer systems may be distributed to each deployment group. The evenness criteria may include a set of rules, requirement, heuristics, operations, or other suitable mechanism for ensuring that the host computer systems are assigned to deployment groups in such a manner that no one deployment group contains a quorum of the nodes for any one data replication group. The system performing the process 400 may then provide deployment group information 406 to one or more other services, such as a deployment service or storage service.

For example, the deployment information may be stored by a storage service for use by the replication group service. In another example, the deployment information may be provided to a deployment service as described above. In variations of the process 400, the deployment information may include a maximum number of host computer systems in the deployment groups, a minimum number of host computer systems in the deployment groups, a threshold within which the deployment groups may be considered balanced, and any other information suitable for ensuring that a deployment does not affect a quorum of the nodes of a data replication group. This information may be calculated by the data replication group service.

Figure 5:
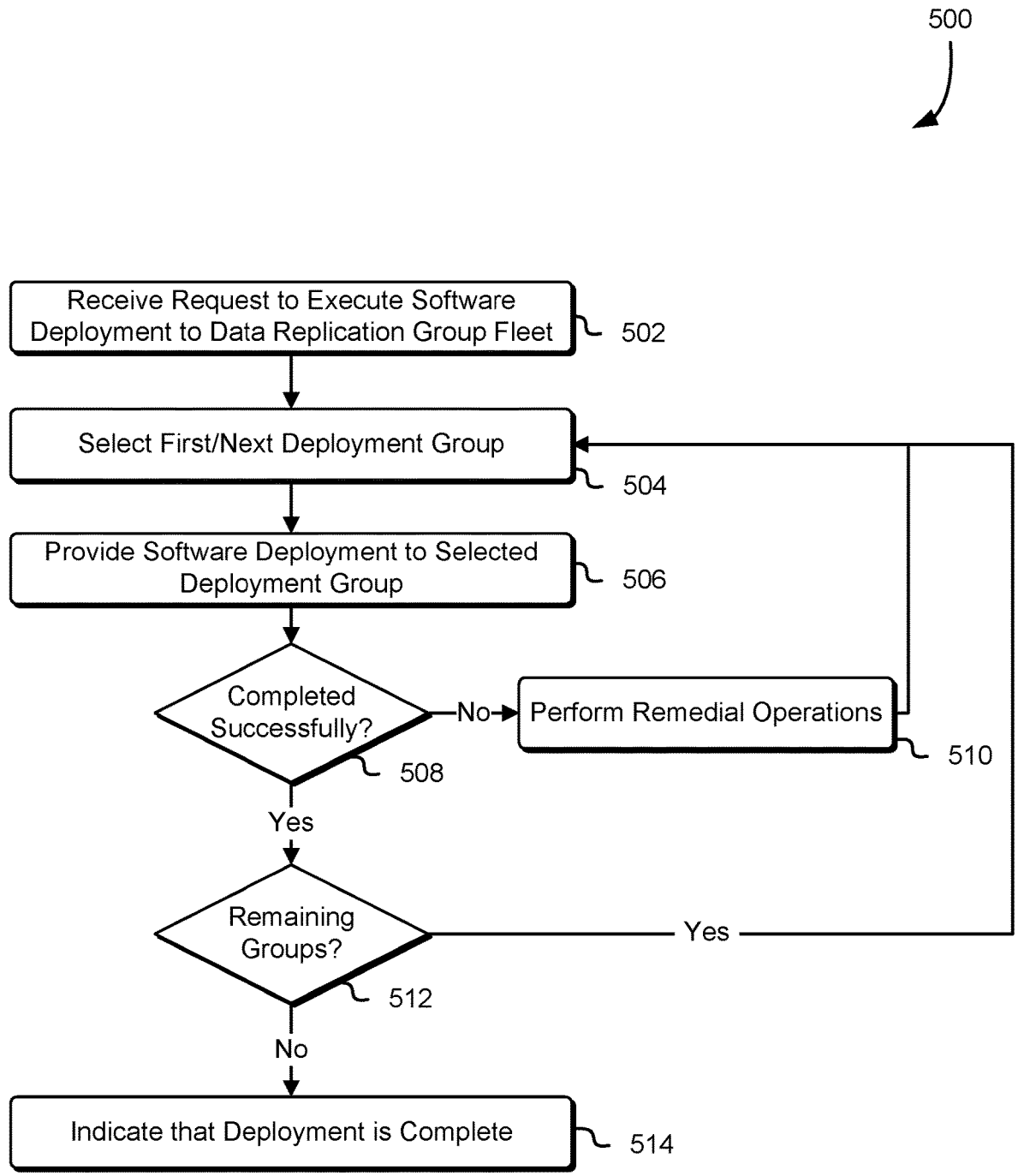
FIG. 5 shows an illustrative process which may be used to execute a deployment strategy for a data replication group fleet in accordance with at least one embodiment.

FIG. 5 is a block diagram illustrating an example of a process 500 for deploying software to a deployment groups including a set of host computer systems of a data replication group fleet in accordance with at least one embodiment. The process 500 may be performed by any suitable system such as a deployment service as described above in connection with FIG. 3. The process 500 includes receiving a request to execute a software deployment to a data replication group fleet 502. The software deployment may include executable code configured to update and/or install an application on a host computer system of the data replication group fleet. As described above, the deployment may be triggered by a software developer, computing resource service provider, customer, or other entity associated with the data replication group fleet. The deployment service or other system executing the process 500 may select the first/next deployment group 504. The deployment groups may be any deployment group described above. Selecting one deployment group at a time to receive the deployment may ensure that a quorum of the nodes of the data replication groups implemented by the host computer systems are not executing the deployment at the same time. In addition, the deployment groups may be selected based at least in part on a variety of factors including as score as described below or any other selection mechanism suitable for determining host computer systems for deployments.

The deployment service may then provide the deployment to the selected deployment group 506. Providing the deployment may include transmitting a software package or image for installation and/or execution by the host computer systems included in the selected deployment group. The deployment service may then determine if the deployment was completed successfully 508. This may include receiving notifications from the host computer systems, executing tests of the host computer systems, waiting some interval of time, or any other operation that may indicate that the deployment completed successfully. If the deployment did not complete successfully, the deployment service may perform remedial operations 510. These may include reverting to a previous version of an application or terminating and re-provisioning host computer systems. Any remedial operation for deployment of software or other executable code may be used in accordance with the present disclosure. In parallel or after completion of the remedial operations the deployment service may select the next deployment group and continue with the deployment. Alternatively, the deployment service may wait until completion of the remedial operation and a determination of whether the deployment was the cause of the error and therefore should be modified before providing the deployment to additional hosts.

If the deployment completed successfully, then the deployment service may determine if additional deployment groups remain 512. If additional deployment groups remain, the deployment service may select the next deployment group 504 and continue the process 500 as described above. If no additional deployment groups remain, the deployment service may indicate that the deployment is complete 514. This may include transmitting a notification to an entity responsible for providing the request to execute the software deployment. In another example, this may include transmitting a notification to a replication group service as described above.

Figure 6:
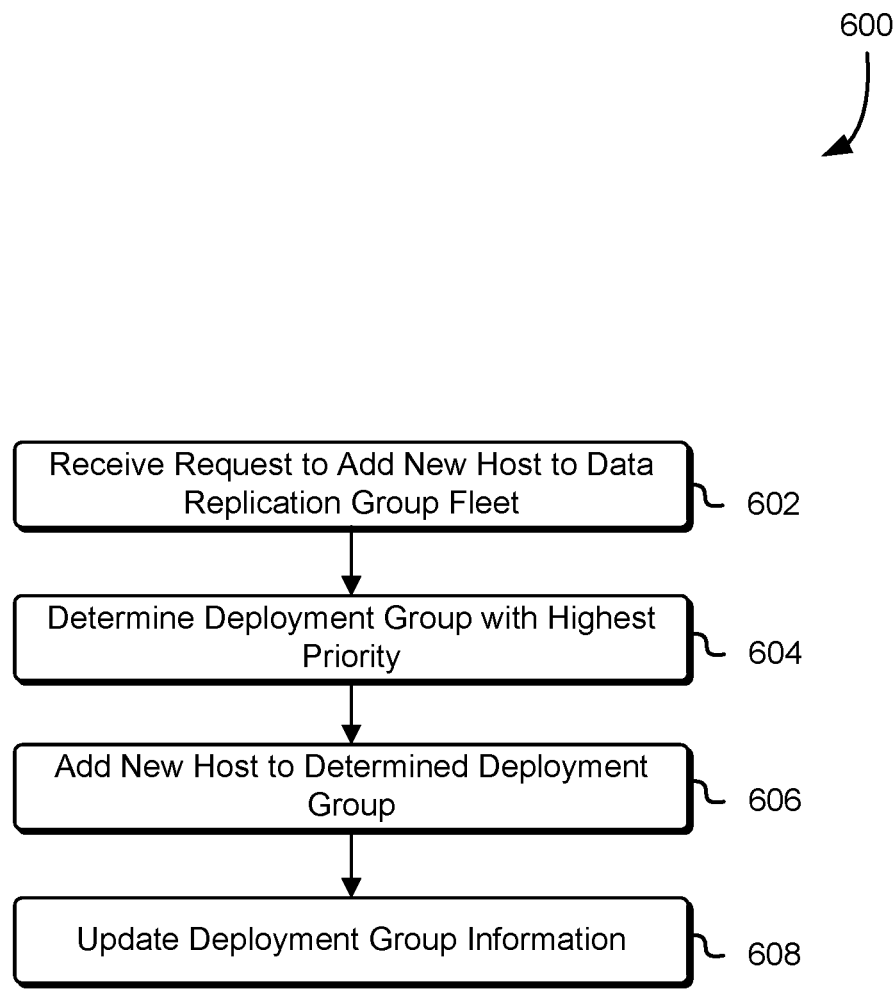
FIG. 6 shows an illustrative process which may be used to provision a new host computer system into a deployment group of a data replication group fleet in accordance with at least one embodiment.

FIG. 6 is a block diagram illustrating an example of a process 600 for provisioning a set of host computer systems of a data replication group fleet in accordance with at least one embodiment. The process 600 may be performed by any suitable system such as a management system of a replication group service as described above in connections with FIGS. 1-3. The process 600 includes receiving a request to add a new host computer system to the data replication group fleet 602. The request may be received as a result of replacing a decommissioned host computer system or may be a result of a management system of the data replication group service determining that addition computing resources (e.g., host computer systems) are required to provide data replication groups to customer or other services of a computing resource service provider. The request may be received at an interface as described above. Additionally, the request may indicate a number of new host computer systems to add to the data replication group fleet.

The management system may then determine a deployment group with the highest priority 604. This information may be included in a database such as the deployment group information as described above. The deployment groups may initially have the same number of host computer systems but over time as host computer systems fail or new host computer systems are added the number of host computer systems in each deployment group may not be the same. A priority may be determined based at least in part on a variety of factors including a number of hosts in the deployment group, a maximum or minimum number of to be included in each deployment group, a latency of the host computer systems in the deployment groups, a type of host computer systems included in the deployment group, a failure rate of the host computer systems included in the deployment group, and/or any other additional information suitable for determining a deployment group to assign a host computer system to such that a deployment to the host computer systems in the deployment group does not affect more than a quorum of the nodes of a data replication group.

In another example, the priority of the deployment groups may be determined by a round robin algorithm or other algorithm for determining priority.

In addition, if two or more deployment groups have the same priority, the management system may select a deployment group at random or based at least in part on a round robin algorithm. The management system may then add the new host computer system to the determined deployment group 606. This may include updating the deployment group data as described above. The management system may then update the deployment group information 608. For example, the management system may record in a data store information associated with the host computer system and the determined deployment group. In addition, this may include providing a tag or other information to the host computer system indicating to the host a particular deployment group the host computer system has been assigned to. This information may also be provided to a deployment service as described above.

Figure 7:
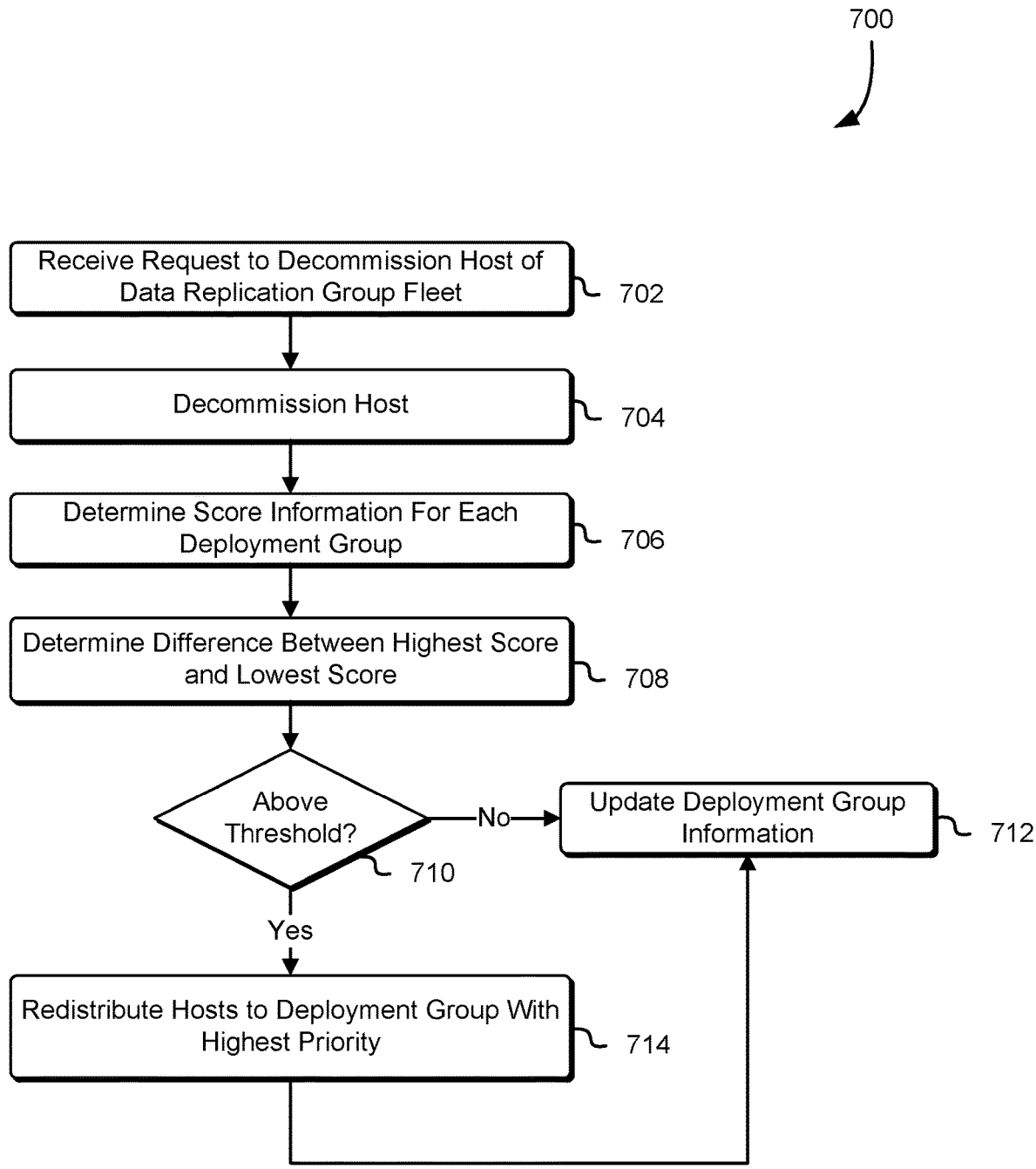
FIG. 7 shows an illustrative process which may be used to decommission and rebalance host computer systems in deployment groups of a data replication group fleet in accordance with at least one embodiment.

FIG. 7 is a block diagram illustrating an example of a process 700 for rebalancing a set of host computer systems between deployment groups in accordance with at least one embodiment. The process 700 may be performed by any suitable system such as a management system of a replication group service as described above in connection with FIGS. 1-3. The process 700 includes receiving a request to decommission a host computer system of a data replication group fleet 702. The request may be transmitted as a result of the host computer system failing or as a result of a reduction in an amount of computing resources required to support the data replication groups. The management system may then decommission the host computer system 704. For example, the management system may terminate the nodes executing on the host computer system.

The management system may then determine a score associated with one or more deployment groups 706. For example, the score assigned to a particular deployment group may by the number of hosts in the deployment group. This may include querying a data base or other data store, such as the deployment information as described above. The management system may obtain a number of deployment groups and a number of host computer systems assigned to each group. In additional a variety of different mechanisms for determining a score associated with the deployment group may be used in accordance with the present disclosure. For example, the score may be based at least in part on a number of health host computer systems in the deployment group and a number of unhealthy (e.g., failed, failing, or possibility failing) host computer systems in the deployment group. In another example, the location of the host computer system (e.g., geographical location) may be a factor in determining a score associated with a deployment group. A priority may be determined based at least in part on the score. For example, a simple priority heuristic may be used to determine a higher priority for deployment groups with a higher score based at least in part on a variety of factors described above. An example of a simple priority heuristic may include a rule that the deployment group with the fewest host computer systems has the highest priority or a rule that the deployment group with the most idle host computer systems has the highest priority.

The management system may then determine a difference (e.g., delta) between the deployment group with the highest score and the deployment group with the lowest score 708. The delta may be calculated by subtracting the scored determined based at least in part on the deployment information. The management system may then determine if the difference (delta) is above a threshold 710. The threshold may be calculated such that if the difference is below the threshold it is ensured that no deployment group or host computer system thereof contains a quorum of the nodes of a data replication group as described above. If the difference is below the threshold 710, the management system may update the deployment group information 712. For example, the management system may record in a data store information associated with the host computer system and the determined deployment group. In addition, this may include providing a tag or other information to the host computer system indicating to the host a particular deployment group the host computer system has been assigned to. This information may also be provided to a deployment service as described above.

If the difference is above the threshold 710, then the management system may redistribute host computer systems 714 from the deployment group with the greatest number of host computer systems to the deployment group with the fewest number of host computer systems. For example, the management system may determine some number of hosts to assign to another deployment group. The number of host may be determined by dividing the difference (delta) by two. Other means of determining the number of host computer systems to redistribute may be used in accordance with the present disclosure, for example, any means that prevents a deployment group from containing a quorum of the nodes of a data replication group may be utilized. For example, if redistributing the host computer systems causes too many nodes in a replication group to be from the same deployment group, those nodes may be identified and moved to another deployment group, for example, so that two nodes are from deployment group 1, two nodes are from deployment group 2, and 3 nodes are from deployment group 3. Other balancing may occur, for example if there is a potential for a single host computer system to host more than one node from any one data replication group. The management system may then update the deployment group information as described above. In variation to the process 700, the process may be executed as a result of adding a new host computer system to the data replication group.

Figure 8:
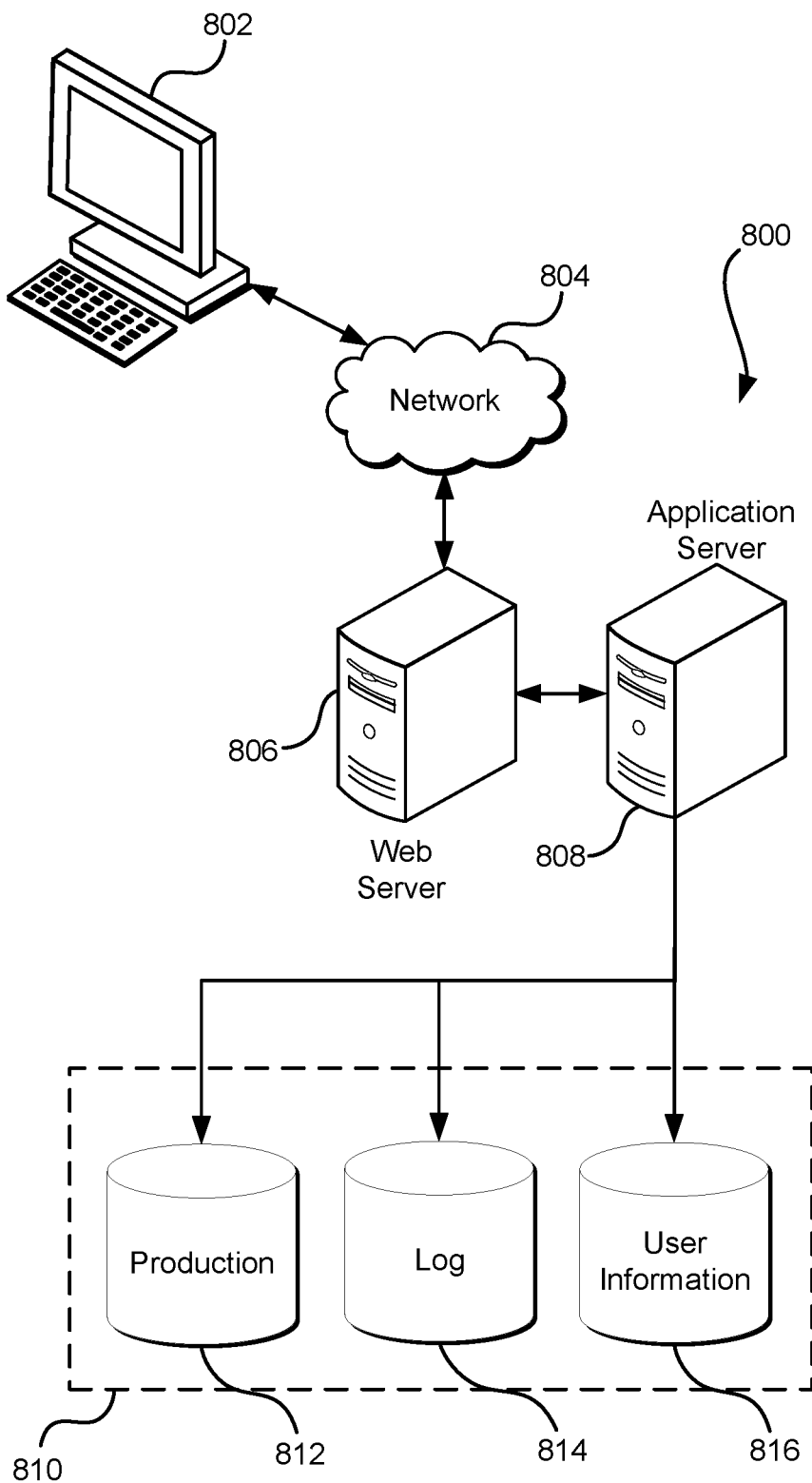
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
generating a number of deployment groups for a plurality of hosts, each deployment group of the number of deployment groups containing at least one host executing at least one node of at least one data replication group, where each data replication group of the at least one data replication group is a member of a set of data replication groups managed by a replication group service, by at least:
    determining a number of nodes to be included in the data replication group; and
    determining the number of deployment groups based at least in part on the number of nodes in the data replication group;
assigning a set of hosts to the number of deployment groups, the set of hosts collectively executing the number of nodes of the data replication groups, wherein the assigning is performed based at least in part on evenness criteria such that removing one or more hosts assigned to a particular deployment group preserves a quorum of nodes within the data replication group;
obtaining a request to deploy software to the number of deployment groups;
assigning a set of scores to the number of deployment groups; and
selecting a first deployment group, based on the score, of the number of deployment groups to deploy software to in response to the request.

2. The computer-implemented method of claim 1, further comprising:
determining to add a new host to the plurality of hosts; and
adding the new host to a particular deployment group of the number of deployment groups based at least in part on a score associated with the particular deployment group.

3. The computer-implemented method of claim 1, wherein selecting the one or more hosts according to evenness criteria among the number of deployment groups further comprises utilizing a round robin algorithm to distribute the one or more hosts.

4. The computer-implemented method of claim 1, further comprising:
selecting a second deployment group of the number of deployment groups, based at least in part on a second score associated with the second deployment group, to deploy software to as a result of a deployment to the first deployment group completing successfully.

5. A system, comprising:
one or more processors; and
memory that includes instructions that, as a result of being executed by the one or more processors, cause the system to:
    determine a number of deployment groups associated with a plurality of host computer systems, each deployment group containing at least one host executing one or more nodes of at least one data replication group;
    assign the plurality of host computer systems to the number of deployment groups, the plurality of host computer systems collectively executing the one or more nodes of the at least one data replication group, wherein the assigning is performed based at least in part on evenness criteria such that removing one or more hosts assigned to a particular deployment group preserves a quorum of nodes within the particular data replication group; and
    create one or more data replication groups based at least in part on the assignment.

6. The system of claim 5, wherein the memory further includes instructions that, as a result of being executed by the one or more processors, cause the system to decommission a first host computer system of the plurality of host computer systems by at least removing the first host computer system from a corresponding deployment group of the number of deployment groups.

7. The system of claim 6, wherein the memory further includes instructions that, as a result of being executed by the one or more processors, cause the system to:
as a result of decommissioning the first host computer system, determine that a threshold has been exceeded, where the threshold corresponds to a maximum difference allowed between a score associated with a first deployment group and a second score associated with a second deployment group; and
indicate that the number of deployment groups require rebalancing.

8. The system of claim 7, wherein the memory further includes instructions that, as a result of being executed by the one or more processors, cause the system to redistribute one or more idle host computer systems from the first deployment group to the second deployment group.

9. The system of claim 5, wherein selecting the plurality of hosts from the number of deployment groups further comprises executing a scheduling algorithm to ensure that none of the number of deployment groups contains a quorum of the one or more nodes of the at least one data replication group.

10. The system of claim 5, wherein the memory further includes instructions that, as a result of being executed by the one or more processors, cause the system to add a new host computer system to a particular deployment group of the number of deployment groups such that adding the new host does not cause the particular deployment group to contain a quorum of the one or more nodes of the at least one data replication group.

11. The system of claim 5, wherein the memory further includes instructions that, as a result of being executed by the one or more processors, cause the system to set a maximum number of host computer systems of the plurality of host computer systems that may be included in a particular deployment group of the number of deployment groups.

12. The system of claim 5, wherein the memory further includes instructions that, as a result of being executed by the one or more processors, cause the system to set a minimum number of host computer systems of the plurality of host computer systems that may be included in a particular deployment group of the number of deployment groups.

13. A set of one or more non-transitory computer-readable storage media having stored thereon executable instructions that, as a result of being executed by one or more processors of a computer system, cause the computer system to:
    generate a plurality of deployment groups based at least in part on the number of nodes in a data replication group where fewer than a quorum of nodes of the data replication group are included in each of the plurality of deployment groups;
    assign a plurality of hosts to the plurality of deployment groups, the plurality of hosts executing one or more nodes of a particular data replication group, wherein the assigning is performed based at least in part on evenness criteria such that removing one or more hosts assigned to the particular deployment group preserves a quorum of nodes within the data replication group; and
    assign a score to each deployment group of the plurality of deployment groups.

14. The set of one or more non-transitory computer-readable storage media of claim 13, wherein the instructions further comprise instructions that, as a result of being executed by the one or more processors, cause the computer system to:
    receive a request to deploy software to the plurality of hosts; and
    determine to fulfill the request based at least in part on the score associated with a first deployment group of the plurality of deployment groups.

15. The set of one or more non-transitory computer-readable storage media of claim 14, wherein the instructions further comprise instructions that, as a result of being executed by the one or more processors, cause the computer system to select the first deployment group of the plurality of deployment groups to provide the software such that failure of the hosts do not affect the quorum of nodes in the data replication group.

16. The set of one or more non-transitory computer-readable storage media of claim 15, wherein the instructions further comprise instructions that, as a result of being executed by the one or more processors, cause the computer system to transmit the software to a set of hosts assigned to the first deployment group.

17. The set of one or more non-transitory computer-readable storage media of claim 16, wherein the instructions further comprise instructions that, as a result of being executed by the one or more processors, cause the computer system to:
    determine that deployment of the software has completed successfully to the first deployment group; and
    select a second deployment group of the plurality of deployment groups to receive the software.

18. The set of one or more non-transitory computer-readable storage media of claim 13, wherein the instructions further comprise instructions that, as a result of being executed by the one or more processors, cause the computer system to, as a result of modifying a membership of a deployment group of the plurality of deployment groups, determine whether a threshold has been exceeded, where the threshold indicates a maximum difference allowed between a first score associated with a first deployment group and a second score associated with a second deployment group.

19. The set of one or more non-transitory computer-readable storage media of claim 18, wherein the instructions further comprise instructions that, as a result of being executed by the one or more processors, cause the computer system to reassign a number of hosts of the plurality of hosts among two or more deployment groups of the plurality of deployment groups as a result of determining the threshold was exceeded.

20. The set of one or more non-transitory computer-readable storage media of claim 19, wherein the instructions further comprise instructions that, as a result of being executed by the one or more processors, cause the computer system to determine a number of hosts to reassign based at least in part on a plurality of scores associated with the plurality of deployment groups.

21. The computer-implemented method of claim 1, wherein none of the deployment groups comprise a majority of the nodes of any one data replication group.

* * * * *